United States Patent [19]
Pernichele et al.

[11] 3,922,167
[45] Nov. 25, 1975

[54] ACIDIFICATION OF PRECIPITATE COPPER SLURRY PRIOR TO FILTRATION AND DRYING

[75] Inventors: Albert D. Pernichele, Oakton, Va.; William D. Southard, Salt Lake City, Utah

[73] Assignee: Kennecott Copper Corporation, New York, N.Y.

[22] Filed: Nov. 8, 1974

[21] Appl. No.: 522,025

[52] U.S. Cl. .................................. 75/109; 75/117
[51] Int. Cl.² ........................................ C22B 15/12
[58] Field of Search ............................. 75/109, 117

[56] References Cited
UNITED STATES PATENTS

| | | | |
|---|---|---|---|
| 3,194,653 | 7/1965 | Keyes | 75/109 |
| 3,260,593 | 7/1966 | Zimmerley et al. | 75/117 |
| 3,330,650 | 7/1967 | Zimmerley et al. | 75/104 |
| 3,634,071 | 1/1972 | Spedden et al. | 75/109 |
| 3,669,651 | 6/1972 | Spedden et al. | 75/104 |
| 3,868,439 | 2/1975 | Wadsworth | 75/117 X |

*Primary Examiner*—G. Ozaki
*Attorney, Agent, or Firm*—Mallinckrodt & Mallinckrodt

[57] ABSTRACT

In the filtration of precipitate copper from aqueous slurries having a pH greater than 2 wherein a filter cake is formed and air is blown through the filter cake for drying, the improvement comprising adding sulfuric acid to the slurry prior to filtration to adjust the pH of the slurry to between about 0.5 and about 2, whereby the drying of the filter cake is facilitated and a low moisture filter cake is consistantly produced. The improved process is particularly advantageous in the filtration of precipitate copper slurries obtained by copper cementation contacting procedures.

6 Claims, 1 Drawing Figure

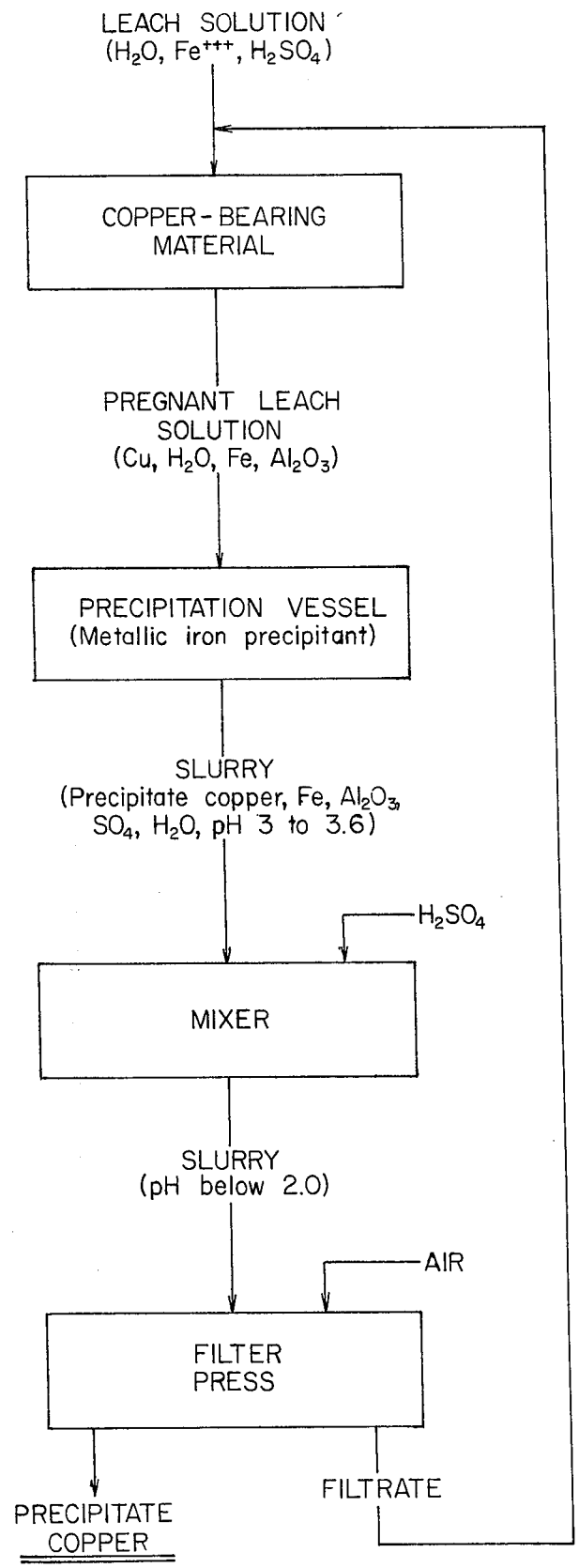

3,922,167

ACIDIFICATION OF PRECIPITATE COPPER SLURRY PRIOR TO FILTRATION AND DRYING

BACKGROUND OF THE INVENTION

1. Field:

This invention relates to processes for filtering aqueous slurries containing precipitate copper wherein the filter cake is dried by blowing air therethrough while in the filter, and particularly to such processes wherein the slurries are obtained by contacting an aqueous leach solution containing ferric ions and dissolved copper values with metallic iron to precipitate the copper.

2. State of the Art:

Hydrometallurgical precipitation or cementation processes for recovering copper values from copper-bearing materials, such as mine waste dumps containing copper sulfide minerals, are well known and widely used. The copper-bearing material is contacted with an acidic, aqueous, leach solution containing ferric and sulfate ions, and copper values from the material being leached are dissolved in the leach solution. The resulting leach solution, pregnant with copper, is then brought into contact with a metal which is higher in the electromotive series than copper, most commonly iron, to precipitate copper from the solution. The resulting slurry is acidic, having a pH higher than 2, usually 3 to 3.6 or higher.

The precipitated copper solids are normally recovered by filtration, and the filtration apparatus generally used has means for drying the filtered copper solids by blowing air through the filter cake. However, the operation of the filtration apparatus, such as a filter press, has been hampered by serious problems. In particular, the degree of drying obtained by the air blowing is highly erratic and unpredictable. As a result, the average or overall drying efficiency has been considerably below expectation, and a relatively high moisture content of the dried filter cake has, heretofore, been accepted as a problem which had to be tolerated. In addition, the precipitation of insoluble salts, primarily iron and aluminum, occurs on the filtering media, resulting in increased resistance to solution flow during filtration and to air flow through the filter cake during the air blow. The filter media gradually becomes plugged and the apparatus must be taken out of service periodically and cleaned.

SUMMARY OF THE INVENTION

The present invention provides an improvement in the process of filtering precipitate copper (also known as cement copper) from aqueous slurries having a pH greater than 2 and drying the resulting filter cake by blowing air therethrough. The improvement comprises adding sulfuric acid to the slurry to reduce its pH to between about 0.5 and 2 prior to the filtration and drying steps. The acidified slurry is then filtered to produce a filter cake of precipitated copper, through which air is blown for drying purposes.

In accordance with the invention, it was discovered that the addition of sulfuric acid to the aqueous slurry prior to the filtration and drying steps to adjust the pH thereof to between about 0.5 and 2 produces several advantageous results. First, additional heat is generated in the filter cake during the air blow, and the additional heat increases the drying efficiency of the air blow. Secondly, any precipitates, such as iron, aluminum, and mixed iron-aluminum salts which form on the filter medium as the filter cake dries, i.e., during the air blow, are removed by the acidified mother liquor during subsequent filtering of slurry. The acidified mother liquor dissolves any and all precipitates which form on the filter medium, and the filtration apparatus becomes essentially self-cleaning. Thirdly, the overall operation of the filtration apparatus is significantly improved. A filter cake of maximum dryness is consistently produced, and, interruptions in operation due to cleaning of the filtration apparatus are essentially eliminated.

A particularly advantageous embodiment of the invention comprises a process for leaching copper values from a copper-bearing material and recovering the copper values from pregnant leach solution. The copper-bearing material is leached with an acidic, aqueous, leach solution which contains ferric and sulfate ions and has a pH of about 3 or less. The pregnant leach solution, containing dissolved copper values, emerges from the copper-bearing material and is contacted with a metal, which is higher in the electromotive series than copper, usually metallic iron, to precipitate the copper values from the solution. The resulting slurry, containing the precipitate copper, has a pH of from about 3 to 3.6 or higher and is treated with sulfuric acid to reduce its pH to between about 0.5 and 2. The slurry is then filtered to form a filter cake containing the precipitate copper, and the filter cake is dried, in place on the filter medium, by blowing air therethrough. The dried filter cake is then removed from the filter.

THE DRAWING

An embodiment of the process representing the best mode presently contemplated of carrying out the invention is illustrated in the accompanying drawing, in which the single FIGURE is a flowsheet depicting the process as applied to recovering precipitate copper from a leach solution used in leaching copper values from a copper-bearing material such as a mine waste dump.

DETAILED DESCRIPTION OF THE ILLUSTRATED EMBODIMENTS

A pregnant leach solution is formed, for example, by leaching copper-bearing material, such as a mine waste dump, with an aqueous solution of ferric sulfate and sulfuric acid. The acidic solution may be freshly made, or may be composed, in whole or in part, of recycled spent solution from the accompanying copper precipitation and recovery operations. The pH of the leach solution is preferably adjusted to about 1.9 to 2.8, preferably 2.1, as the solution is introduced into the waste dump or other material being leached, see Zimmerly et al. U.S. Pat. No. 3,260,593.

The effluent leach solution emerging from the copper-bearing material, such as the mine waste dump, will be pregnant with copper, iron, alumina, and sulfate ions and will have a pH of typically about 2.5. Copper is precipitated from the pregnant leach solution by contacting the solution with a metal which is higher in the electromotive series than copper. The leach solution can be contacted with metallic iron in a launder or other vessel according to customary cementation procedure, or the pregnant leach can be contacted with metallic iron in a cone precipitator of the type disclosed in the Back et al. U.S. Pat. No. 3,154,411.

The slurry produced by the precipitation of copper typically has a pH of about 3 to 3.5 with the mother liquor containing iron, principally as ferrous iron, alumina and sulfate impurities. In accordance with the invention, a sufficient amount of sulfuric acid is mixed with the slurry to lower the pH thereof to about 2.0 or less, preferably from about 0.5 to about 2.0.

After the pH of the slurry has been adjusted, the precipitated copper solids are filtered from the mother liquor to form a filter cake containing the precipitate copper, and air is blown through the filter cake for drying purposes. The dried filter cake is removed from the filter, and the filtrate solution obtained from filtering the slurry is recirculated for further leaching of the copper-bearing material.

It has been found that the drying of the filter cake is facilitated and that a low moisture-containing filter cake can consistently be produced according to the process of the present invention. In addition, any precipitates which form on the filter medium during the air blow are removed by the acidified mother liquor during subsequent filtering of slurry. Thus, the filtration equipment becomes essentially self-cleaning.

It is believed that the improved drying of the filter cake results primarily from increased heat generation in the filter cake during the air blowing step. Heating is generated in the filter cake during the air blow portion of the filter cycle by autoxidation of copper in the filter cake. The autoxidation proceeds substantially as follows:

$$4\ Cu° + O_2(air) \rightarrow Cu_2O \tag{1}$$

The reaction occurring according to equation (1) theoretically generates $7.34 \times 10^4$ Btu per pound of copper oxide formed (calculated at 25°C.). It has been found that the efficiency of the autoxidation of equation (1) is enhanced or catalyzed according to the present invention by adjusting the pH of the slurry to a value of about 2.0 or less prior to the filtration thereof. The increase in the rate of autoxidation of the copper in the filter cake according to reaction 1 results in increased heat generation in the filter cake which, in turn, facilitates the drying of the filter cake.

In addition, it has been found that copper oxide, either produced by the mechanism of equation 1 or otherwise present in the solids comprising the filter cake, undergoes another exothermic reaction when sulfuric acid is present. The copper oxide is converted to copper sulfate according to the following reaction:

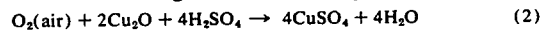
$$O_2(air) + 2Cu_2O + 4H_2SO_4 \rightarrow 4CuSO_4 + 4H_2O \tag{2}$$

with the generation of $9.5 \times 10^4$ Btu per pound mole of $Cu_2O$ undergoing reaction (calculated at 25°C. ignoring any contribution from heats of solution). The heat generated by the reaction of equation 2 further facilitates the drying of the filter cake, and the reaction of equation 2 also has a beneficial effect on increasing the rate of the reaction of equation 1. Any film of copper oxide which tends to form on the surfaces of the copper particles due to the action of equation 1, is removed or dissolved therefrom by the reaction shown in equation 2. The continuous cleaning of the surfaces of the copper particles accelerates the autoxidation of the copper according to equation 1, and a corresponding increase in heat is generated, which further facilitates the drying of the filter cake.

Adjusting the pH of the slurry to about 2.0 or less also results in greatly improved operation of the filter presses. Any precipitants such as iron, aluminum, and mixed iron-aluminum salts which form on the filter medium during the filter cake drying step are dissolved and removed from the filter medium according to this invention during subsequent filtering of slurry which has a pH of about 2 or less. It has been found that the filtration equipment becomes essentially self-cleaning, whereas when slurry from the cementation step (having a pH higher than 2, usually 3 to 3.6 or higher) is filtered, without any prior adjustment of its pH, precipitants form on the filter media during the drying of the filter cake and are not removed during subsequent filtering of slurry. These precipitants progressively accumulate on the filter media which results in increased resistance to flow of mother liquor during the slurry filtration cycles, as well as increased resistance to air flow through the filter cake during the drying or air blow cycles. The filter media gradually becomes impervious or plugged and the filtration apparatus must be taken out of service periodically and cleaned. The process of this invention essentially eliminates such interruptions in the filter operation, as the filter is essentially self-cleaning.

The following tests demonstrate the utility and highly advantageous results of the present process:

A sample of a slurry obtained by conventional cementation of a pregnant leach solution from a commercial mine dump leaching operation was divided into two portions. The slurry had a pH of 3.61. Sulfuric acid was added to one portion of the slurry in an amount such that the pH thereof was adjusted to 1.5. Nothing was added to the other sample, and its pH remained at 3.61. Both portions were filtered in a conventional filter press under identical conditions. The filtration included air blowing of the respective filter cakes which were formed, the air blowing being under identical conditions for both of the filter cakes. The solids obtained from the slurry having a pH of 3.61 contained 10.7% moisture, whereas the solids obtained from the slurry to which sulfuric acid had been added to adjust its pH to 1.5 contained 6.3% moisture.

Several full scale tests were made on filtering apparatus located at a commercial mine dump leaching operation wherein an acidic aqueous leach solution containing ferric and sulfate ions is percolated through the mine dump, the pregnant leach solution coming from the mine dump is contacted with metallic iron, in a conventional cementation step to precipitate the copper values from the solution, and the slurry from the cementation step is filtered to remove the precipitated solids from the mother liquor. Sulfuric acid was added to the slurry prior to the filtration step in three separate tests which were spaced over a one-month period. The amount of sulfuric acid added was sufficient to lower the pH of the slurry to about 2.0 During each test, a significant increase in temperature and a decrease of moisture content of the filter cake occurred together with significant decrease in moisture content of filtered solids. The filter medium was cleaned and remained clean during the periods of acid addition. The average moisture content in the filter cake being discharged from the filter during the three spearate tests was approximately 11 percent or less as compared to monthly average moisture contents of 18.3 percent and 17.8 percent for the filtered solids discharged from the same filter for the preceeding two months.

Whereas this invention is here illustrated and described with respect to certain preferred forms thereof, it is to be understood that many variations are possible without departing from the inventive concepts particularly pointed out in the claims.

We claim:

1. In the process of filtering precipitate copper from aqueous slurries containing dissolved copper values and having a pH of greater than 2, wherein a filter cake is formed and air is blown through the filter cake for drying, the improvement which comprises adding sulfuric acid to the slurry to reduce its pH to between about 0.5 and about 2 prior to the filtration and drying, whereby the drying of the filter cake is facilitated and a low moisture filter cake is produced.

2. A process in accordance with claim 1, wherein the aqueous slurries are obtained by contacting aqueous solutions containing ferric ions and dissolved copper values with metallic iron to precipitate the copper.

3. A process in accordance with claim 2, wherein said aqueous solutions are obtained from leaching copper-bearing material with an acidic aqueous leach solution containing ferric and sulfate ions.

4. A process of leaching copper values from a copper-bearing material and recovering the copper values from the pregnant leach solution, comprising leaching said copper-bearing material with an acidic, aqueous, leach solution which contains ferric and sulfate ions and has a pH of about 3 or less; contacting the pregnant leach solution with a metal which is higher in the electromotive series than copper to precipitate copper values from the solution, thereby forming a slurry; adding sulfuric acid to the slurry to adjust the pH thereof to between about 0.5 and about 2; filtering the slurry to form a filter cake containing the precipitated copper and a filtrate comprising the aqueous mother liquor; and drying the filter cake by passing air therethrough.

5. A process in accordance with claim 4, wherein the filtrate is recycled for further use as said acidic, aqueous leach solution in the leaching of the copper-bearing material.

6. A process in accordance with claim 4, wherein the metal is iron.

* * * * *